United States Patent [19]

Barron

[11] 4,306,806
[45] Dec. 22, 1981

[54] GUN TUBE ORIENTATION SENSOR; TARGET MIRROR

[75] Inventor: Morton A. Barron, Potomac, Md.

[73] Assignee: The United States of America as represented by the Secretary of the Army, Washington, D.C.

[21] Appl. No.: 77,441

[22] Filed: Sep. 20, 1979

[51] Int. Cl.³ .................. G01B 11/26; G01B 11/27
[52] U.S. Cl. ................................ 356/138; 356/153
[58] Field of Search ............... 356/138, 152, 153–154

[56] References Cited

U.S. PATENT DOCUMENTS

| 3,480,367 | 11/1969 | Husted et al. | 356/138 |
| 3,486,826 | 12/1969 | Colvin et al. | 356/152 |
| 3,891,323 | 6/1975 | Ryan et al. | 356/154 |
| 4,126,394 | 11/1978 | Ulrich | 356/138 |

OTHER PUBLICATIONS

Bohlin, J. D., "Simultaneous Optical Monitoring of Angular & Translational Alignment", Applied Optics, 4-1972, pp. 961–962.

Primary Examiner—William H. Punter
Attorney, Agent, or Firm—Nathan Edelberg; Robert P. Gibson; Saul Elbaum

[57] ABSTRACT

Disclosed is an apparatus useful for obtaining mutual angular alignment of two remotely positioned objects about three orthogonal axes. The apparatus comprises essentially a collimated light source associated with one of the two objects, a prism associated with the other of the two objects, and a viewing screen or device for viewing images created by the light source and the prism. The face of the prism is partially reflective and partially transmissive of light received the light source, whereby the image projected by the light source is split into two distinct images by the prism. Together, the two images give an indication of the relative orientations of the two objects about three mutually orthogonal axes. The apparatus is useful for detecting and correcting changes in the orientation of a gun tube after firing. It is also useful for obtaining precise alignment of tools or precision manufacturing equipment.

4 Claims, 12 Drawing Figures

GUN TUBE ORIENTATION SENSOR; TARGET MIRROR

RIGHTS OF THE GOVERNMENT

The invention described herein may be manufactured, used, or licensed by or for the U.S. Government for governmental purposes without the payment to the inventor of any royalty thereon.

FIELD OF THE INVENTION

The invention herein is related specifically to the problem of detecting the relative orientations of two remotely positioned objects, and assuring the mutual angular alignment of the objects about orthogonal axes. The invention is related specifically to the problem of detecting changes the orientation of the firing tube of a mortar and being able to correct this change.

DESCRIPTION OF THE PRIOR ART

The mortar is historically the weapon for concentrating fire in a particular area. It is usually intended to fire in the general direction of a target and fire often enough to cause injury to the target. However, the mortar men desire to come as close to the true target as possible without adding undue cost, weight, complexity or reaction time to the mortar. Over generations, better aiming procedures have been developed and more stable tubes, base plates, and ammunition have been developed to improve the mortars precision.

Heretofore, in order to detect changes in the orientation and provide adjustments therefore, telescopic sights with vernier adjustments, aiming stakes, precision surveying equipment (aiming circles), spirit levels, and careful laying procedures have been incorporated into techniques for firing mortars. There are many significant drawbacks to these systems, some of which are discussed extensively in the specification of U.S. Pat. No. 3,891,323, the disclosure of which is incorporated herein by reference.

The aforesaid patent discloses an apparatus for aligning a mortar tube with a remotely positioned stationary object. The apparatus includes a collimated light source on one of the mortar tube or the stationary object, and a reflecting mirror on the other. An image screen receives the image reflected by the reflecting mirror from the light source. The position of the image on the screen is indicative of the relative orientation of the mortar tube to the stationary object. The apparatus of U.S. Pat. No. 3,891,323 represents a substantial improvement over the historically used aiming methods, as described above, but is limited in accuracy by virtue of the fact that the alignment of a single image and a grid upon the viewing screen is relied upon to ascertain the position of the mortar tube relative to the stationary remote object.

U.S. Pat. No. 3,480,367 to Husted et al discloses a triaxial alignment device which utilizes dual images to ascertain the relative alignment of two remotely positioned objects about three orthogonal axes. The use of two images, each of which must be aligned with a predetermined reference mark and with each other, results in greater accuracy of alignment. The device of Husted et al suffers, however, from the drawback that it is relatively expensive and complex to manufacture. The device requires multiple prisms, precision alignment of various structural components, fluid type seals, a liquid component, and in some cases, a loosely mounted floating mirror. Such a structure is relatively fragile and not readily suitable for portability or rugged use.

U.S. Pat. No. 4,126,394 to Ulrich discloses an aiming device for a mortar tube which generates dual image, thus gaining the accuracy described above. However, this device suffers from some of the same drawbacks as the Husted et al device in that it requires fluid tight construction, a fluid component and a floating mirror, and is thus readily susceptible to damage.

It is accordingly an object of the invention to provide a new and novel alignment device capable of indicating angular alignment about three axes and which suffers none of the drawbacks of the prior art devices.

It is another object of the invention to provide a novel triaxial alignment device which is simple in construction and inexpensive to manufacture.

It is yet another object of the invention to provide a triaxial alignment device which is both highly accurate and reliable. It is still another object of the invention to provide such an alignment device which is rugged, durable, and is not readily susceptible to damage.

These and other objects of the present invention will become more fully apparent with reference to the following specifications and drawings which relate to several preferred embodiments of the present invention.

SUMMARY OF THE INVENTION

The present invention relates to apparatus useful for aligning two remotely positioned objects about three mutually orthogonal axes. The apparatus comprises a collimated light source associated with one of the objects, a prism associated with the other object, and a viewing device for receiving images reflected from the light source by the prism. The prism is a 45 degree prism, with its hypotenuse facing the light source. The hypotenuse is partially reflective of light incident thereto, and reflects an image from the face thereof. Light which does not strike the reflective portion of the hypotenuse enters the prism and is reflected by the prisms' rear surfaces, thus creating a second image. Both images are received on the viewing screen. By virtue of the fact that the image reflected by the rear surfaces of the prism is inverted, the device is capable of indicating a relative rotation of one of the objects about the axis of the light beam between the light source and prism.

BRIEF DESCRIPTION OF THE DRAWINGS

FIG. 4b is a top view of the embodiment of FIG. 4a.

DESCRIPTION OF THE PREFERRED EMBODIMENTS

Figure 1:
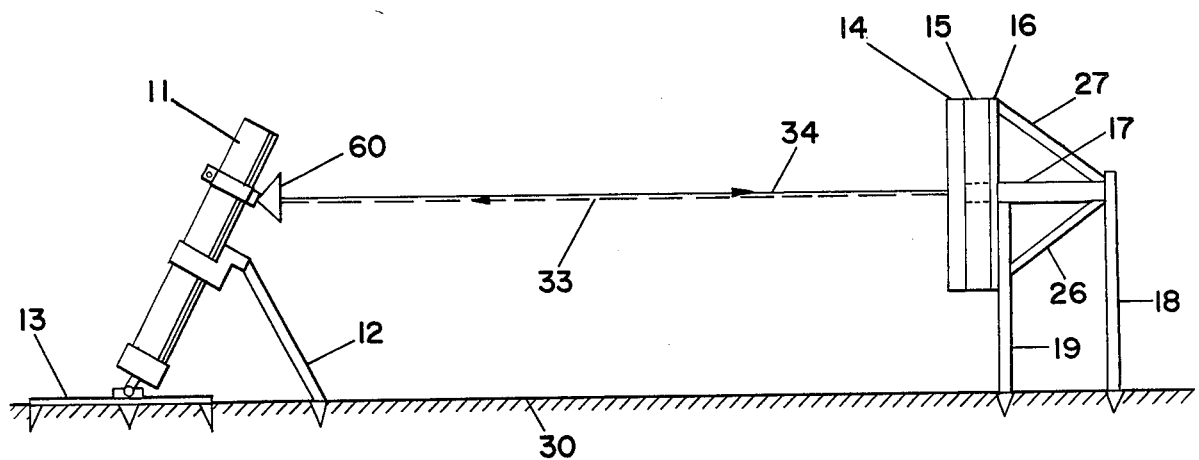
FIG. 1 is a drawing of a first embodiment of the invention.

The invention will first be described with reference to FIG. 1 wherein there is shown a mortar 11, mounted on legs 12 and base plate 13. At a distance along the surface of the earth, 30, there is mounted a collimated light source 17, secured in place by means of stakes 18 and 19. Source 17 directs a collimated beam of light of distinctive shape, i.e. in the shape of a cross, through an aperature in viewing screen 15. Screen 15 is supported on face plate 16 by means of struts 26 and 27. Grid 14, on the surface of screen 15, provides reference markings as well as shading of the screen from incident sun light.

The structure of light source 17, screen 15 and grid 14 is more particurly described in the specification of U.S. Pat. No. 3,891,323, the disclosure of which is incorporated herein by reference.

Figure 2A:
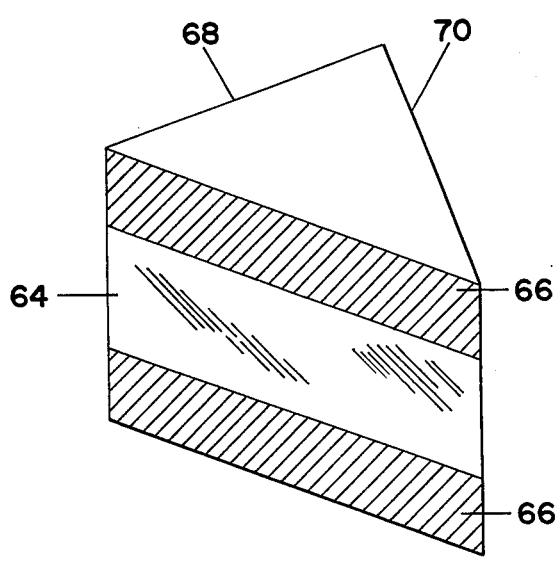
FIGS. 2a and 2b show exemplary configurations of the prism of the invention.
Figure 2B:
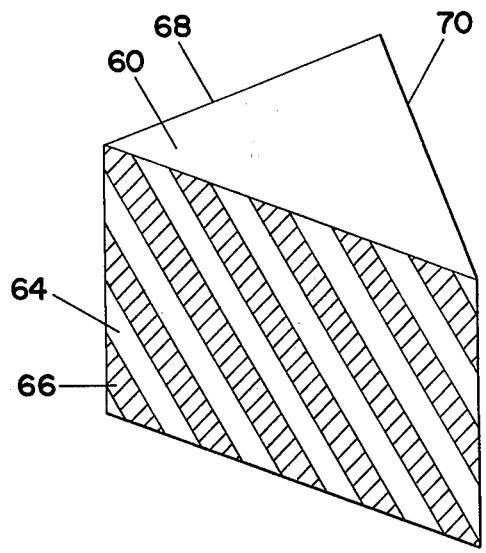

Prism 60 is mounted on mortar tube 11, and receives the light beam directed from source 17. FIGS. 2a and 2b show in greater detail the structure of prism 60. The prism is a 45 degree prism, having legs 68 and 70, and hypotenuse face 64. Portions of the hypotenuse are coated with a reflective material 66. The remainder of face 64 is left uncoated, thus allowing light to be transmitted to the interior of the prism. In FIG. 2a the reflective portions 66 comprise strips of reflective material along the edges of the hypotenuse of the prism. FIG. 2b shows a second configuration comprising diagonal stripes of reflective material on the prism hypotenuse.

The prism 60 on the mortar tube is mounted so that the partially reflective surface faces light source 17. A portion of the light from source 17 will strike the reflective areas 66 and be reflected to form an image on screen 15. The remaining portion of the light will enter the prism through the nonreflective portions of surface 64 and be reflected by the rear surfaces of the prism. As is well known, the image entering the prism will be inverted as it is reflected from the rear walls thereof. Thus a distinct, second image is projected upon screen 15. The prism may be formed of colored glass so that a distinctive color will be imparted to the second image. This will enable an operator to readily distinguish between the first and second images.

The manner in which the apparatus indicates triaxial alignment will now be described with reference to FIG. 1 and FIGS. 3a–3d. In FIG. 1, 33 and 34 represent the paths of the light beam traveling to and from the prism 60 from light source 17. This line will represent the X axis. The Y axis will be a line perpendicular to the plane of the drawing, and passing through the apex of legs 68 and 70 of the prism 60. The Z axis will be a vertical line in the plane of the drawing, mutually perpendicular to the X and Y axes.

Figure 3A:
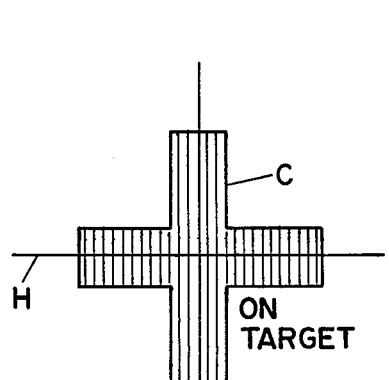
FIGS. 3a –3d show the various images which may be projected on the viewing screen by the prism.
Figure 3B:
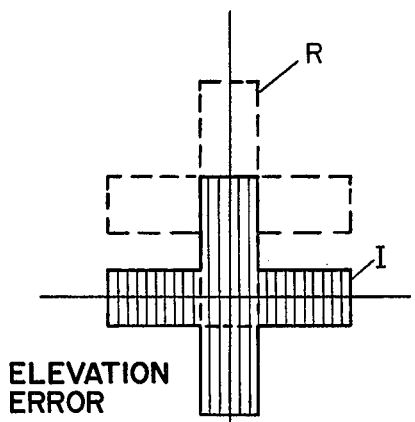

FIG. 3a illustrates the image formed on screen 15 when mortar 11 and screen 15 are mutually aligned about the three above described axes. A composite image C is formed on the screen in alignment with hairlines H, used as reference markings. The composite image C is composed of a reflected image R, as shown in FIG. 3b, and formed by the light reflected from reflective portions 66, and an inverted image I formed by the light reflected by the rear walls of the prism. When the mortar and the screen 15 are in perfect mutual alignment the two images I and R will be perfectly coincident as shown in FIG. 3a.

FIG. 3b illustrates the images formed on screen 15 caused by an elevational error in the orientation of the mortar 11. An elevational error is a movement of the mortar causing a rotation of prism 60 about the Y axis. When the prism is rotated in such a fashion, image R, reflected from surfaces 66, is displaced either above or below the horizontal hairline H. The inverted image I, reflected by the rear surfaces of prism 60, will remain in alignment with the horizontal hairline. This is the reslt of the fact that a light beam entering the prism is reflected by both of the rear walls. Thus the rotation of one of the rear walls is compensated for by the mutual rotation of the other wall. Such is a well known optical phenomenon. The result is a set of images as shown in FIG. 3b, wherein the displaced reflected image R indicates an elevation error.

Figure 3C:
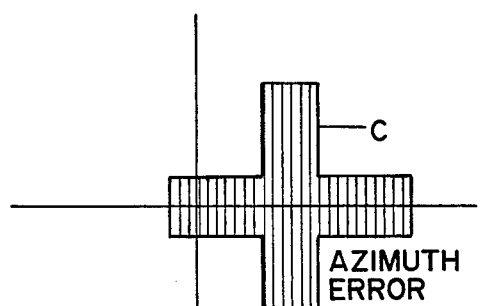

FIG. 3c illustrates the image appearing on screen 15 when there is an azimuth error in the orientation of the mortar tube. An azimuth error is a displacement of the mortar tube which causes a rotation of the prism about the vertical Z axis. Such a rotation causes both the reflected and inverted images, R and I, to be displaced to the left or right of the vertical hairline. Since both images are jointly displaced only a single composite image C appears on the screen 15.

Figure 3D:
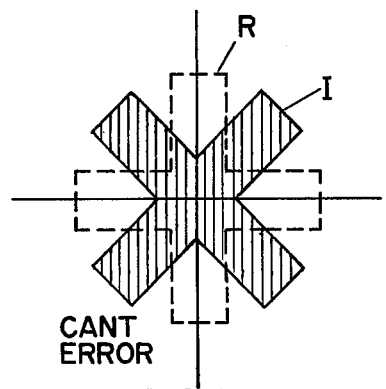

FIG. 3d illustrates the images appearing on screen 15 when the mortar is rotated about the X axis coincident with the path of travel of the light beam. Such a misalignment of the mortar is called a cant error. The image R reflected by surfaces 66 will not be affected by such a rotation. However, since the prism 60 is rotated relative to the light source 17, the inverted image I appearing on screen 15 will be rotated out of alignment with the hairlines.

Thus it can be seen that the apparatus is capable of producing multiple images indicitive of the relative positions of the two objects, enabling an operator to precisely align the two objects about three mutually orthogonal axes by aligning the multiple images with each other and with reference markings.

Figure 4A:
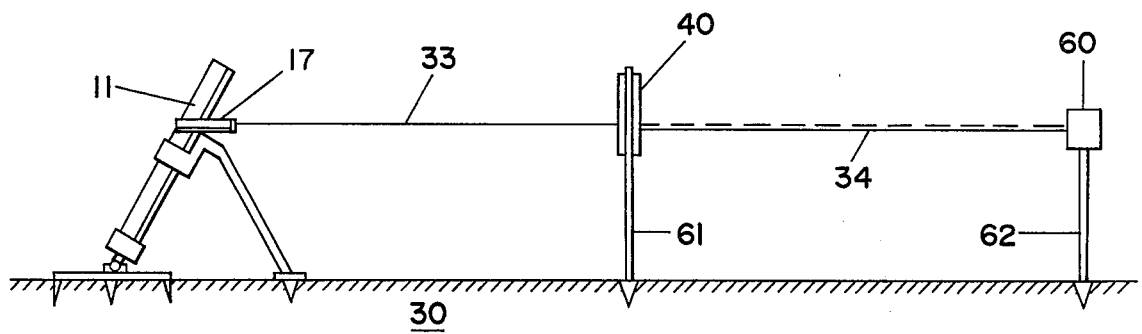
FIG. 4a shows a second embodiment of the invention.
Figure 4B:
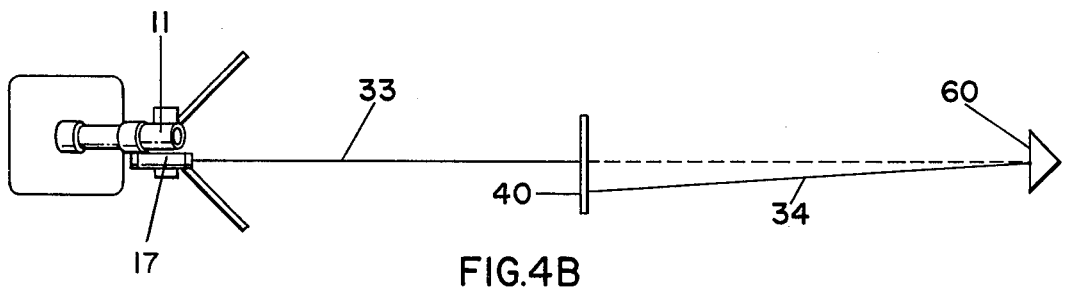

It is noted that when the prism is oriented, as shown in FIG. 1, with the line of the apex between legs 68 and 70 oriented in a horizontal plane the image I is unaffected by elevational error. If the line of the apex between legs 68 and 70 of the prism is oriented in a vertical plane, as shown in FIGS. 4a and 4b, the image I will be unaffected by azimuthal error. Thus the images shown in FIGS. 3b and 3c would be interchanged.

Figure 5:
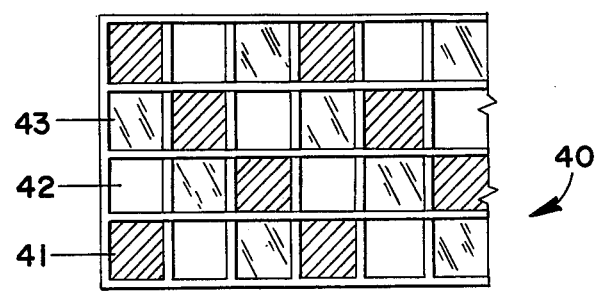
FIG. 5 illustrates the viewing screen of FIGS. 4a and 4b.

In FIGS. 4a and 4b light source 17 is secured to mortar 11, while the prism 60 is secured to the surface of the earth by stake 62 at a remote location. A modified viewing screen 40 is secured intermediate the two positions by stake 61 along the path of the light beams 33 and 34. Screen 40, the structure of which is more particularly described in the disclosure of U.S. Pat. No. 3,891,323, is shown in FIG. 5. It is composed of alternating segments of translucent material 43, transparent material 42 and opaque material 41. A portion of the image projected from source 17 will fall upon opaque portion 41, creating a first image on the screen. Another portion of the light projected from source 17 will pass through the screen by means of transparent portions 42 and will fall upon the surface of prism 60. Prism 60 will reflect a portion of this light by means of surface portion 66, and another portion by means of the rear surfaces of the prism, as described above. The two images R and I reflected by prism 60 will appear on the surface of screen 40 which faces prism 60. These will be viewable by an operator of the mortar through translucent portions 43, as described in the aforesaid U.S. Pat. No. 3,891,323. Thus, when each of the images R and I are in perfect alignment with each other and with the image on the opaque portions of the screen, the mortar 11 will be in perfect mutual alignment with the prism 60 about X, Y, and Z axes. This enables a mortar operator to determine when the position of the mortar has deviated from an initially prearranged position which is in alignment with the prism.

Figure 6A:
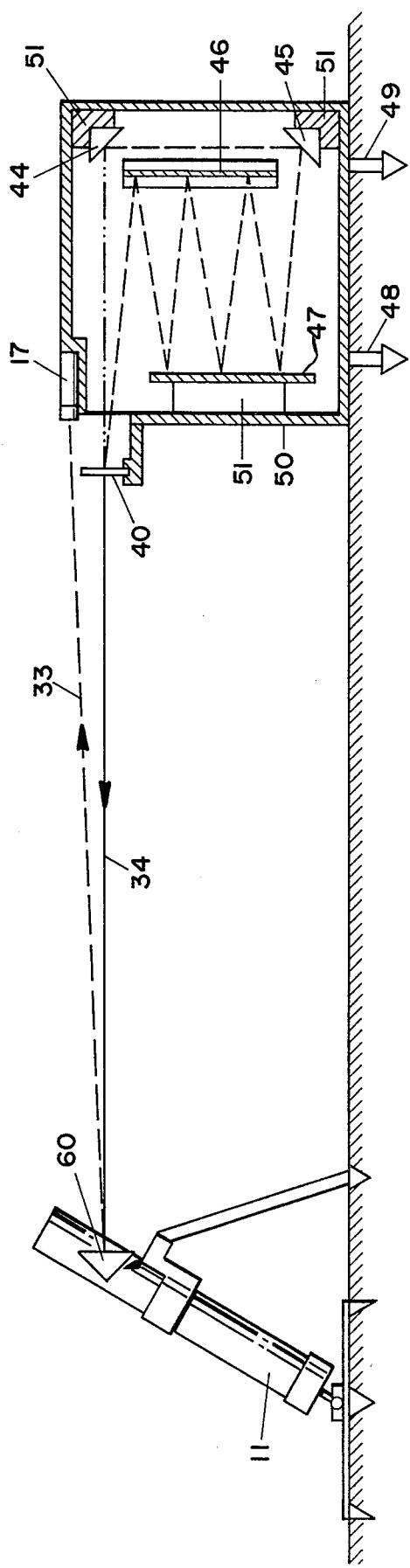
FIGS. 6a and 6b illustrate still further embodiments of the invention.

FIG. 6a is a modification of the embodiment shown in FIGS. 4a and 4b. In FIG. 6a the prism 60 is secured to the mortar 11, while light source 17 is attached to a box member 50. The screen 40, as described above, is also secured to the box member, which is maintained in its initial position by means of stakes 48 and 49. Reflective mirror elements 44, 45, 46 and 47 are mounted as shown in the box 50 by means of mounting brackets 51. Light from source 17 travels path 33, as shown, is reflected by prism 60 along path 34 whereby it strikes the screen 40. A portion of the light forms a first image on the opaque portion 41, as previously described. The portion of light passing through transparent elements 42 is reflected by mirrors 44 and 45, several times by mirrors 47 and 46, and forms images R and I on the translucent portions 43 of the screen. The deviated path of the light through the box 50 lengthens the distance traveled by the light beam thus magnifying the discrepancy between the positions of the images reflected by the mirrors 44 through 47 and the image formed on the opaque portions 41. This enables an operator to align the mortar and the screen and light source unit with greater accuracy.

Figure 6B:
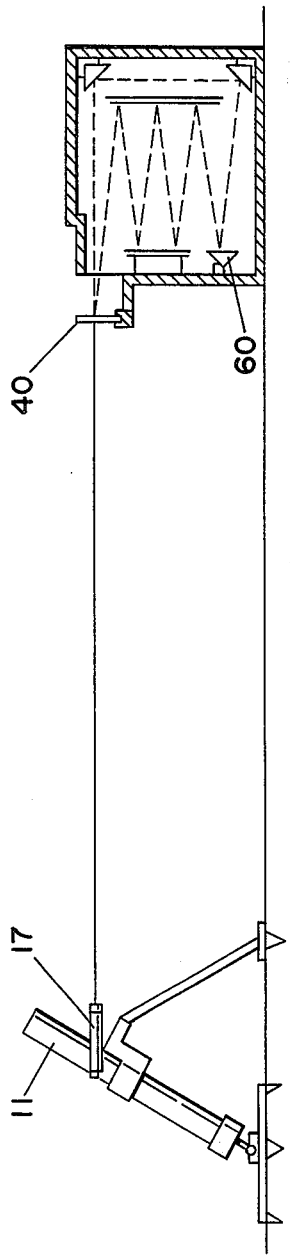

FIG. 6b illustrates a variation of the apparatus shown in FIG. 6a. in FIG. 6b the light source 17 is mounted upon the mortar 11, while the prism 60 is mounted interior of the ox 50 in the path of the light beam. As can be seen in FIG. 6b, the prism takes the place of a portion of at least one of the reflecting mirrors 46 or 47.

The invention may be subject to several deviations from the details described above. For example, the pattern created by reflective portions 66 may be varied from those shown in FIGS. 2a and 2b. The pattern created by the reflective portions may form horizontal or vertical stripes, a checkerboard, or any other equivalent arrangement. While a distinctive color may be imparted to the inverted image by forming the prism of a colored transparent material, the same effect may be realized by placing a colored filter layer over the transparent portions of the hypotenuse of the prism.

It can be seen that an apparatus has been provided which achieves the accuracy of the prior art devices and which is significantly more durable than those devices. The present invention may be constructed more cheaply and simply than the prior art devices which require complex structures and fluid elements.

It is to be understood that the inventor does not desire to be limited to the exact details of construction shown and described, for obvious modifications will occur to a person skilled in the art.

I claim:

1. Apparatus for obtaining mutual angular alignment of two objects about three orthogonal axes, comprising
   first means, associated with one of the two objects, comprising projecting means for projecting a non-circular image toward the other of the two objects;
   second means, associated with the other object, consisting essentially of a prism having alternate transmissive and reflective portions disposed symmetrically over the entire hypotenuse face thereof,
   and a sole viewing means for receiving said image as it is reflected by said second means.

2. Apparatus for obtaining mutual angular alignment of two objects about three orthogonal axes, comprising
   first means associated with one of the two objects, said first means comprising projecting means for projecting a non-circular image toward the other of the two objects;
   second means, associated with the other object, comprising a prism for both reflecting and inverting the image received from said projecting means, said prism having alternate transmissive and reflective portions disposed symmetrically over the entire hypotenuse face thereof,
   and a sole viewing means for receiving said image as it is reflected by said second means.

3. Apparatus as in claim 1 or 2 wherein said alternate transmissive and reflective portions comprise transmissive and reflective stripes on said face of said prism.

4. Apparatus as in claim 3 wherein said stripes are disposed diagonally with respect to an edge of said hypotenuse face.

* * * * *